(12) United States Patent
Ben Ismail et al.

(10) Patent No.: US 7,272,706 B2
(45) Date of Patent: Sep. 18, 2007

(54) SOFTWARE UPGRADE OVER A USB CONNECTION

(75) Inventors: Waeil Ben Ismail, Ghent (BE); Kristl Haesaerts, Melsbroek (BE)

(73) Assignee: Thomson Licensing, Boulogne-Billancourt (FR)

( * ) Notice: Subject to any disclaimer, the term of this patent is extended or adjusted under 35 U.S.C. 154(b) by 874 days.

(21) Appl. No.: 10/697,476

(22) Filed: Oct. 31, 2003

(65) Prior Publication Data

US 2004/0103177 A1 May 27, 2004

(30) Foreign Application Priority Data

Nov. 13, 2002 (EP) .................................. 02447218

(51) Int. Cl.
*H04B 1/38* (2006.01)
*G06F 9/44* (2006.01)

(52) U.S. Cl. ............................... 713/1; 713/2; 375/222; 717/168; 717/169; 717/170; 717/171; 717/172; 717/173

(58) Field of Classification Search ...................... None
See application file for complete search history.

(56) References Cited

U.S. PATENT DOCUMENTS

| | | | | |
|---|---|---|---|---|
| 5,268,928 A | * | 12/1993 | Herh et al. ................... | 375/222 |
| 5,452,454 A | | 9/1995 | Basu .......................... | 395/700 |
| 5,974,547 A | | 10/1999 | Klimenko ...................... | 713/2 |
| 6,031,867 A | * | 2/2000 | Johnson et al. ............... | 375/222 |
| 6,135,651 A | * | 10/2000 | Leinfelder et al. ............ | 717/168 |
| 6,308,061 B1 | | 10/2001 | Criss et al. .................. | 455/418 |
| 6,457,175 B1 | * | 9/2002 | Lerche ........................ | 717/173 |
| 6,526,092 B1 | * | 2/2003 | Nelson et al. ............... | 375/222 |
| 6,928,108 B2 | * | 8/2005 | Nelson et al. ............... | 375/222 |
| 7,043,664 B1 | * | 5/2006 | Chiloyan ..................... | 714/5 |
| 2002/0046263 A1 | | 4/2002 | Camerini et al. ............. | 709/219 |
| 2002/0083362 A1 | | 6/2002 | Semo et al. .................. | 714/4 |
| 2002/0114384 A1 | | 8/2002 | Nelson et al. ............... | 375/222 |
| 2004/0049617 A1 | * | 3/2004 | Wang et al. .................. | 710/100 |
| 2006/0155737 A1 | * | 7/2006 | Fawcett ...................... | 707/101 |

FOREIGN PATENT DOCUMENTS

| | | |
|---|---|---|
| EP | 1198108 | 4/2002 |
| WO | WO0054149 | 9/2000 |

OTHER PUBLICATIONS

European Search Report of Mar. 12, 2003.

* cited by examiner

*Primary Examiner*—A. Elamin
(74) *Attorney, Agent, or Firm*—Joseph J. Laks; Robert D. Shedd; Paul P. Kiel

(57) ABSTRACT

The present invention is related to an electronics device, such as a modem, having an interface operable with a complete protocol stack code in normal operation, and comprising a non-volatile memory, such as a flash memory containing a code for booting said device. The device is characterized in that software of said device is upgradable during a booting operation of said device via said interface, wherein said boot code comprises a lightweight protocol stack code for said interface, said lightweight protocol stack comprising a subset of the layers of the complete protocol stack.

10 Claims, 7 Drawing Sheets

SOFTWARE UPGRADE OVER A USB CONNECTION

This application claims the benefit under 35 U.S.C. §119 (a) of European patent application No. 02447218.5 filed Nov. 13, 2002.

BACKGROUND OF THE INVENTION

The present invention relates to an electronic device, such as a modem, having an interface operable with a complete protocol stack code in normal operation, and comprising a non-volatile memory, such as a flash memory containing a code for booting said device.

At present there exist several mechanisms through which software upgrades, bug fixes for electronic devices and the like are distributed to the user. A first possibility is that a technician travels to the site where the device needs an upgrade, and replaces the memory section which needs updating.

More efficient software upgrades during full operational mode are also already known, and can for example be done over the Universal Serial Bus (USB). According to one known method, the software upgrade is done on fully operational software, wherein the new software is first downloaded to the SDRAM and subsequently downloaded to the flash memory. However, this involves the risk that if any failure occurs during the download to the Flash memory the device will become inoperable.

Further it is already known to download files during the boot operation via the Ethernet interface. According to this solution the flash memory contains a boot code which typically resides in the top part of the flash memory, and is programmed there by a flash programming tool. This boot code is started when the device board is powered on, and is used to download a file via the Ethernet interface. For this purpose the boot code includes the Bootstrap protocol (BOOTP) for sending BOOTP requests over the Ethernet port, and the trivial file transfer protocol (TFTP) for downloading the file over the Ethernet port. Such a device can be provided with a USB, wherein a USB protocol stack code is typically available in the operational software, but not in the boot code because the size of this USB code is too large to be put in a flash memory with a typical size of for example 4 Mb. Hence upgrading software over USB during the booting operation is impossible.

BRIEF SUMMARY OF THE INVENTION

It is an object of the present application to provide a device, a system and a method which provide broader upgrade options during the booting operation.

The present invention provides an electronic device such as a modem, having an interface operable with a complete protocol stack code in normal operation, and comprising a non-volatile memory, such as a flash memory containing a code for booting said device, wherein software of said device is upgradable during a booting operation of said device via said interface, and said boot code comprises a lightweight protocol stack code for said interface, said lightweight protocol stack comprising a subset of the layers of the complete protocol stack.

In normal operation of the device a complete protocol stack code is typically available in the operational software for controlling all operations of this interface, and for handling all protocols associated with this interface. Typical interfaces are for example USB, USB2, or Firewall. In order to provide broader upgrade options, the device according to the invention is organized in such a way that the software of the device can also be upgraded during a booting operation over this type of interface.

The complete protocol stack code usually occupies a large amount of memory, and would not be suitable for the boot code in the flash memory. In terms of the cost price of the device, it is desirable to limit the size of the flash memory. Therefor it is a further object of the invention to keep the size of the associated boot code in the non-volatile memory small. This object is achieved by using a boot code which comprises only a lightweight protocol stack code for handling the interface during the boot operation.

According to a further embodiment of the present invention the boot code comprises a control code for detection of said interface, and a protocol handling code for transmitting and receiving via said interface. Such a boot code allows sending data over this interface, which data can be put in a memory of the device for upgrading the software of this device.

In a preferred embodiment of the invention the interface is a USB interface. The complete USB protocol stack, being a relatively large protocol stack is typically available in the operational software, while the boot code is kept small by using only a lightweight protocol stack, i.e. reduced in memory size.

A further object of the present invention concerns an electronic device such as a modem, having a USB interface operable with a complete protocol stack code in normal operation, wherein software of said device is upgradable during a booting operation of said device via said USB interface.

Accordingly, in another aspect of the present invention, said boot code contains the Ethernet on USB mapping part of said complete protocol stack code. This part does not support the AAL5/ATM/USB (ATM: asynchronous transfer mode; AAL: ATM adaption layer) mapping necessary for communication over a wide area network (WAN). In other words, certain layers are removed. However, this part ensures the necessary encapsulation enabling successful transmission of a BOOTP request to an appropriate device such as a computer, connected to the electronic device at least through the USB port. More particularly, the BOOTP, User Datagram Protocol (UDP), and Internet Protocol (IP) are used during the boot operation, allowing the encapsulation of BOOTP/UDP/IP onto Ethernet. Furthermore, this Ethernet protocol stack over a USB is a lightweight protocol stack compared to the complete stack, hence resulting in a smaller boot code.

Accordingly, in a further aspect of the present invention, a second memory comprises the complete USB protocol stack code for communication over a wide area network (WAN). This code supports the AAL5/ATM/USB mapping necessary for communication over a wide area network (WAN) during normal operation.

In a preferred embodiment the modem further comprises an Ethernet interface, wherein the boot code comprises a code for transmitting and receiving via said Ethernet interface during the boot operation. This allows for a software upgrade of the modem over either the USB interface or the Ethernet interface.

The invention further relates to a system for downloading files to an electronic device according to any of the above described embodiments, comprising said device and a computer provided with a driver for said interface, wherein said computer is connected to said device over said interface, wherein said remote computer contains an executable program code for communicating with said device and for providing the files to be downloaded. In the case of a USB interface, the USB driver controls the USB hardware within the computer, and the software on the computer can communicate with this driver via a set of program interfaces.

This executable program code generally presents itself on a PC as an upgrade wizard program, which is a program that guides the user step by step through a procedure using a series of dialogue boxes.

If the electronic device comprises a USB and an ethernet interface, the upgrade wizard program will be able to upgrade both via the USB or via the Ethernet port.

The basic communication primitives between a USB host, usually a computer, and a USB device are pipes and endpoints (EP). An endpoint is the logical transmission path between the USB host and some function within the USB device. Endpoints usually exist to send data in one direction only, and they are used for more advanced communication paths such as pipes.

According to a particular embodiment of the system according to the present invention, a connection is established respectively on endpoints (EP) 4 and 5 of the USB interface to allow frames to be sent to and from the USB device. An endpoint is associated with the use of certain protocols, and the choice of EP4 and EP5 is related with the lightweight protocol used during the booting operation.

To make this connection possible the boot code supports EP0 which is used for control, EP4 which is used as a software download interface in bulk mode, and EP5 which is used as an acknowledgement interface in bulk mode. The other endpoints are disabled during the boot operation, and all traffic on endpoints other than EP4 and EP5 is discarded.

The present invention also provides a method for downloading a file into a memory part of an electronic device provided with a USB connection, comprising the steps of:
- storing said file in one or more computers, wherein at least one computer is provided with a USB interface;
- connecting said device to one or more computers over at least the universal serial bus (USB);
- sending at least one boot request from said device to said one or more computers over said USB interface using a reduced USB protocol stack compared to a complete USB protocol stack;
- sending at least one boot reply from said one or more computer to said device;
- sending a file transfer request from said device to one of said one or more computers;
- sending said stored file from said one computer to said device.

According to a preferred aspect of this method, said boot request and boot reply use the BOOTP protocol. The sending of said file transfer request and of said stored file is preferably done using the Trivial File Transfer protocol (TFTP). Once the file is stored in a memory part of the device, it may be advantageous to boot from that file, depending on the type of file that is downloaded.

In a particular embodiment of this method the electronic device is also connected to at least one computer over an Ethernet connection. In that case the boot request is sent to both the USB and Ethernet interface. According to a first possibility the file transfer is established over the interface which receives first a boot reply. According to another possibility the device will look at both the boot replies received from the computer connected over the USB interface and from the computer connected over the Ethernet interface. Depending on for instance the importance or the version of the files to be transferred, the device can give priority to either one of the computers.

BRIEF DESCRIPTION OF DRAWINGS

Further features and advantages of the present invention will become apparent from the following description of a preferred embodiment thereof illustrated with reference to the accompanying drawings, wherein.

DETAILED DESCRIPTION OF THE INVENTION

Figure 1:
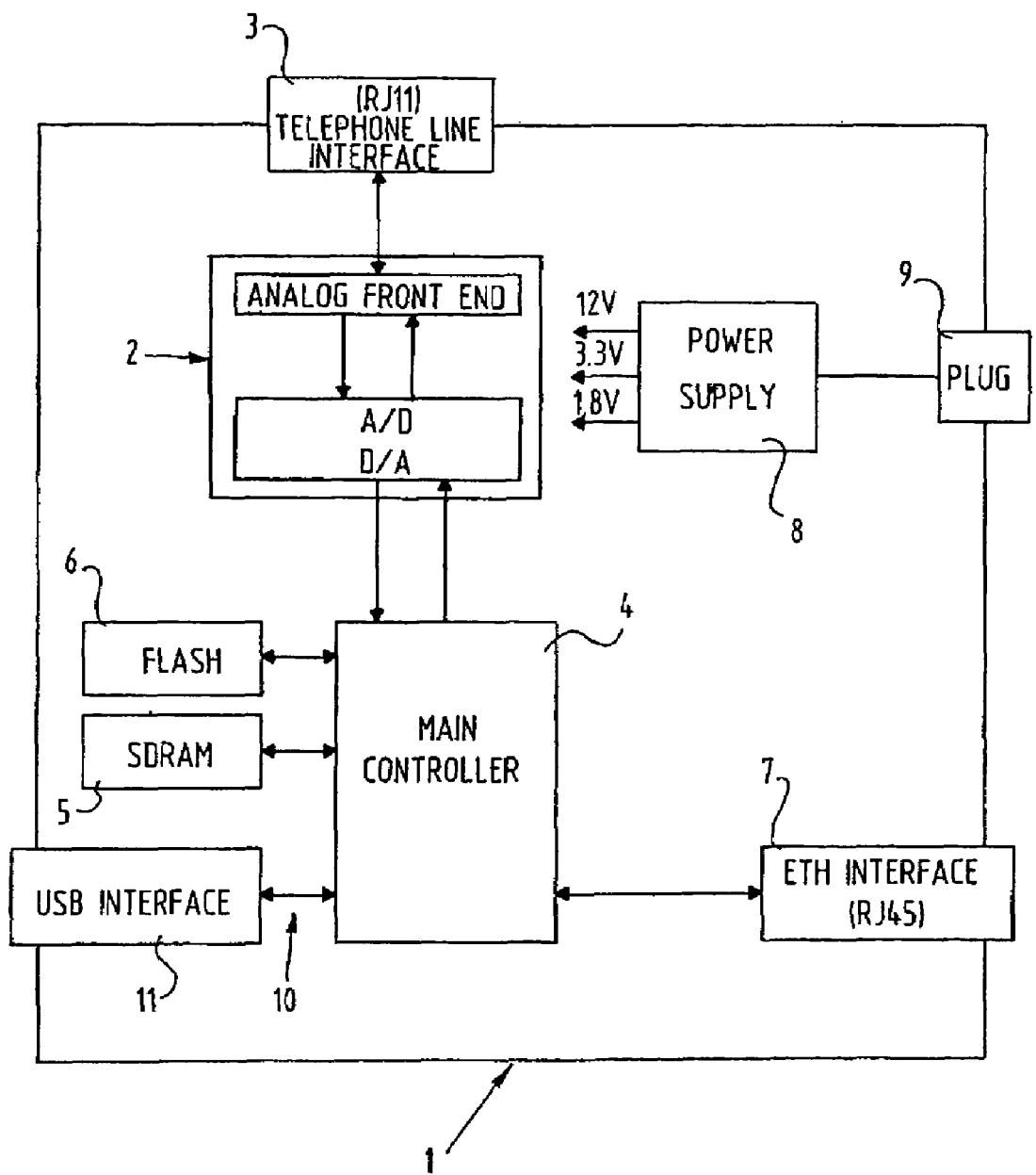
FIG. 1 is a block diagram of the main hardware components of a modem system according to the present invention.

Referring to FIG. 1, there is given a schematic overview of the main hardware components of the present modem device 1. This hardware architecture forms the link between the telephone line and one or more computers. The telephone line interface 3 is typically a DSL termination interface, using an RJ-11 connector.

The ADSL modem device 1 further includes a first block 2 containing the analog front-end and an application specific integrated circuit (ASIC) for terminating the analog line interface and transforming digital data from the main controller 4 into an analog band-pass signal, which ASIC will be referred to as ADSL ASIC. The analog front-end module consists of a high-pass filter for filtering out the plain old telephone service (POTS) signals, and for allowing through the ADSL signals; a hybrid, for instance a passive network, performing 2-wire to 4-wire conversion or vice versa for splitting between the upstream and the downstream signals; an upstream line driver, and a downstream receiver filter. The ADSL ASIC provides analog to digital (A/D) and D/A conversion.

The main controller 4 substantially comprises a digital ADSL modem ASIC, an Ethernet-ATM adaptor, and a microprocessor.

The digital ADSL modem ASIC contains the signal modulator/demodulator which, using the DMT (digital multitone) modulation approach, modulates signals coming from the Ethernet or USB interface, and delivers them to the ADSL ASIC, and vice versa.

The controller has an associated memory pool consisting of a Synchronous Dynamic Random Access Memory 5 (SDRAM) and a Flash electrically programmable read-only memory (EPROM) 6, which is a non-volatile memory which can be erased and reprogrammed in blocks. The size of the flash EPROM is typically 2 Mb, and expandable to 8 Mb. The SDRAM, which typically has a size of 8 Mb, communicates with the main controller over a bus having a width of for example 32 bits. The Flash EPROM typically allows 16 bit access.

An ethernet interface 7 is connected to the controller via a dedicated interface. The Ethernet interface 7 is typically a 10/100BaseT interface, with a RJ-45 connector.

A USB interface 11 including a dedicated USB integrated circuit is connected via the parallel interface, consisting of for instance a 16 bit wide data-bus, and a 1 bit wide address bus, to the main controller 4.

The device is further provided with a standard power supply plug 9 connected to the internal power supply 8. The power supply provides a plurality of voltages at its output, being for example 12 V, 3.3 V and 1.8 V. These supply voltages provide the necessary power for the hardware components.

Furthermore, the device usually comprises a plurality of visual indicators—not shown—such as LEDs (light-emitting diodes) to give an indication of the behaviour of the different hardware components of the device.

During the normal operation of the modem the device functions as follows. The ADSL signal is received from the telephone line and translated in standard ATM cells with specific virtual channel and virtual path combinations encapsulated in AAL5. These combinations determine whether the incoming traffic consists of operation and maintenance traffic, in which case it is routed and processed by the onboard processor, or of bridged Ethernet frames to be sent unaltered either to the USB or to Ethernet, or routed IP packets to be forwarded to USB or Ethernet.

Figure 2:
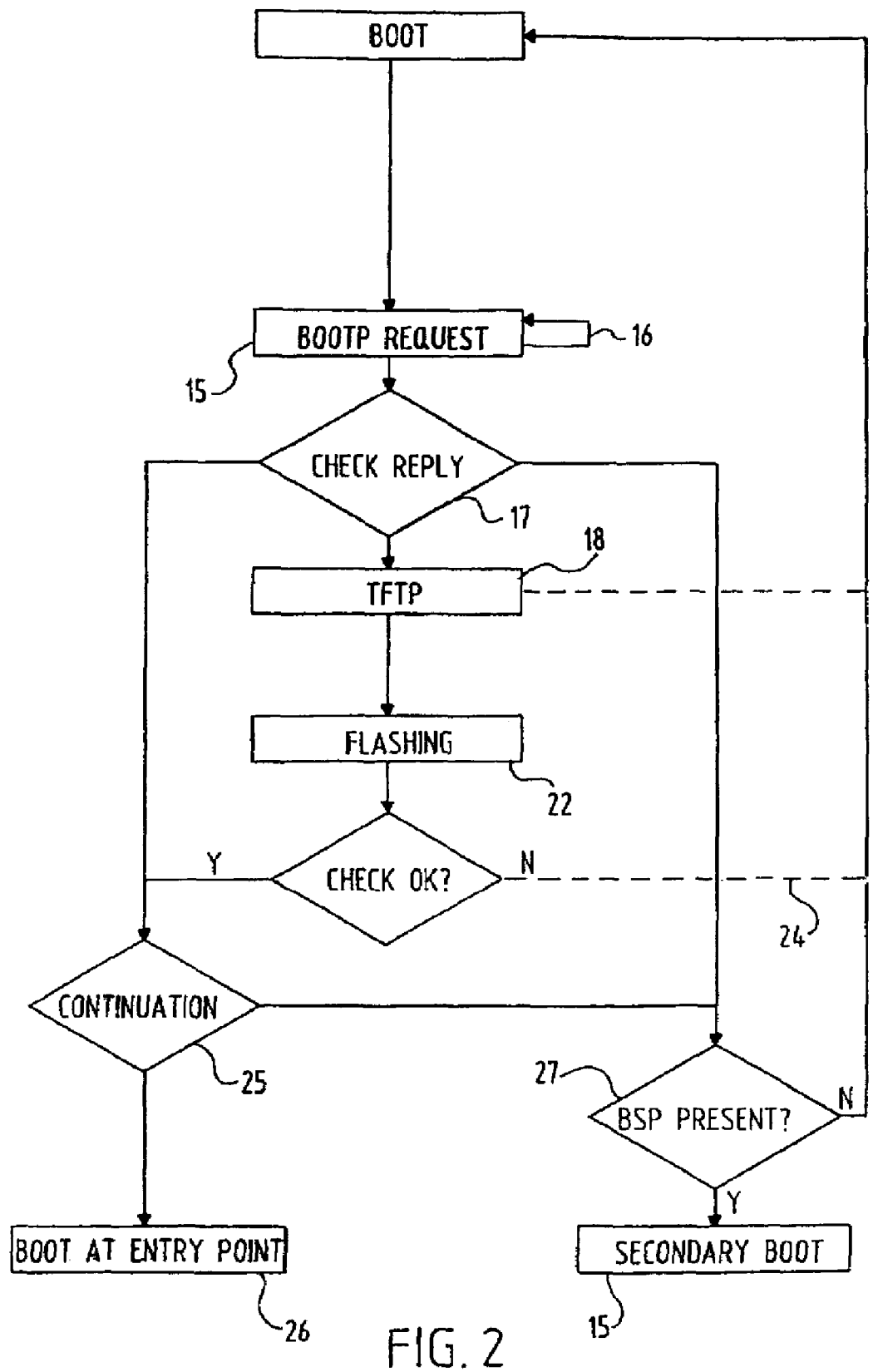
FIG. 2 shows a flow diagram of the process for booting a modem system according to a method of the present invention.

FIG. 2 shows a flow diagram of the process for booting a modem system. When the board is powered on, the controller starts executing code from the internal ROM, whereupon it jumps to the start address of the boot code in the Flash memory, which is the entry point of the board support package (BSP). Now it starts executing the BSP.

The not yet executed part of the BSP together with the boot code is copied into the SDRAM, followed by the global variables and the initialized data. The program counter is set to the code in the SDRAM, and the controller starts executing. When the BSP has finished its initializations, the program jumps to the entry point of the boot code.

Now a BOOTP request message is sent and a BOOTP response timer starts to run. The contents of this message, and the protocol stack used will be described in detail with reference to FIGS. 3 and 4. Thereafter the device is waiting for a reply.

In the case of a timeout or an invalid reply, a new request is sent as indicated with arrow 16. The number of times this resending can take place depends for example on a request parameter specifying the number of retries in the case of timeout or invalid replies. In case a valid reply message is received the IP address is set, and the contents of this reply message are checked, as shown in check block 17.

When the reply message contains a filename, the following step in the process is the file download using Trivial File Transfer Protocol (TFTP), as shown in block 18. This means that data packets are transmitted from the host computer to the SDRAM, as will be described in more detail below.

At every download the file header of the transferred file is checked. A file has for example the following format:

TABLE 1

| 0 | 1 | 2 | 3 |
|---|---|---|---|
| file format identifier | | | |
| destination start address | | | |
| cyclic redundancy checksum of the data field | | | |
| Board Type | | Tag area size | |
| Tag code | Value . . . (n bytes) | | |
| . . . | . . . | | |
| File Data (actual data) | | | |
| . . . | | | |

Every row of Table 1 represents 4 bytes. The first four bytes of the file header represent the file format identifier which contains for example BLI1, meaning Boot Loader Image Version one.

The destination of the file can be found in the subsequent four bytes containing the destination start address in the SDRAM or the Flash memory.

The Tag codes are optional and can contain all types of information, and specify for instance the address used to boot from the file, the total size of the file data, etc.

Still referring to FIG. 2, depending on the destination, the data will either be left in the SDRAM or be flashed in the Flash memory, as indicated with the reference numeral 22. In the latter case the destination region, including the flash verification pattern, is erased and the data is written; the written data is then checked, for example by recalculating and comparing the Cyclic Redundancy Check (CRC) present in the file header of the sent file (see Table 1). If the check data generated by the modem is the same as the sent check data, the flash verification pattern is written. If they are not the same, a reboot is performed as indicated with line 24.

The following step in the process, determined in the query block 25, depends on the flags in the BOOTP reply message. The options are to boot at a certain file entry point, represented by block 26 or, if a Board Support Package (BSP) is present at query 27, to perform a secondary boot from this package or, if the latter is not present, to reboot from the start.

It will be apparent that the above description only provides the main steps in the process, and that most operations use a timeout method with loops which can be repeated a number of times depending on the particular type of modem. Also some additional tests may be performed.

Figure 3:
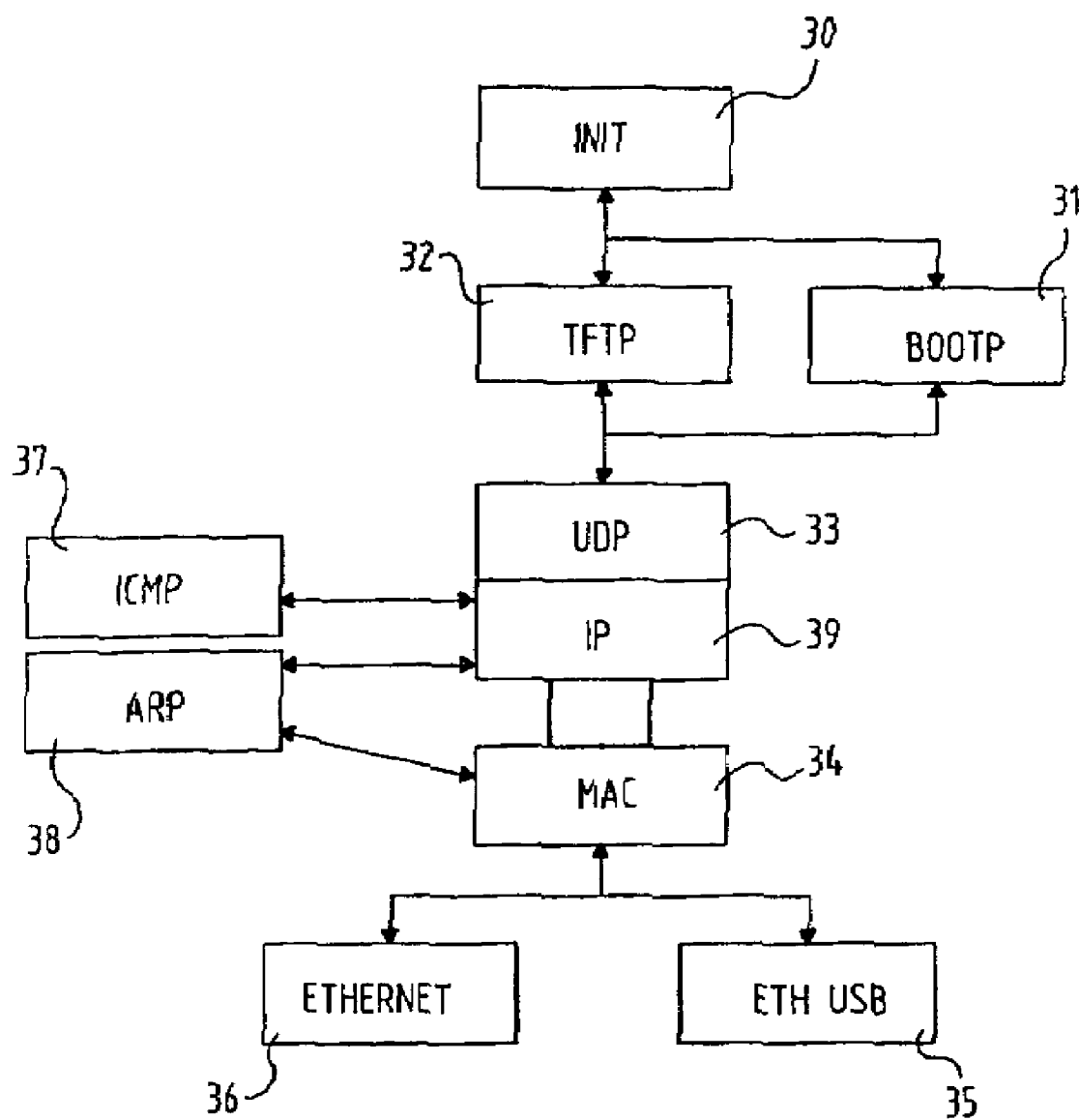
FIG. 3 shows a block diagram of the protocol stack used for the system according to an embodiment of the present invention.
Figure 4:
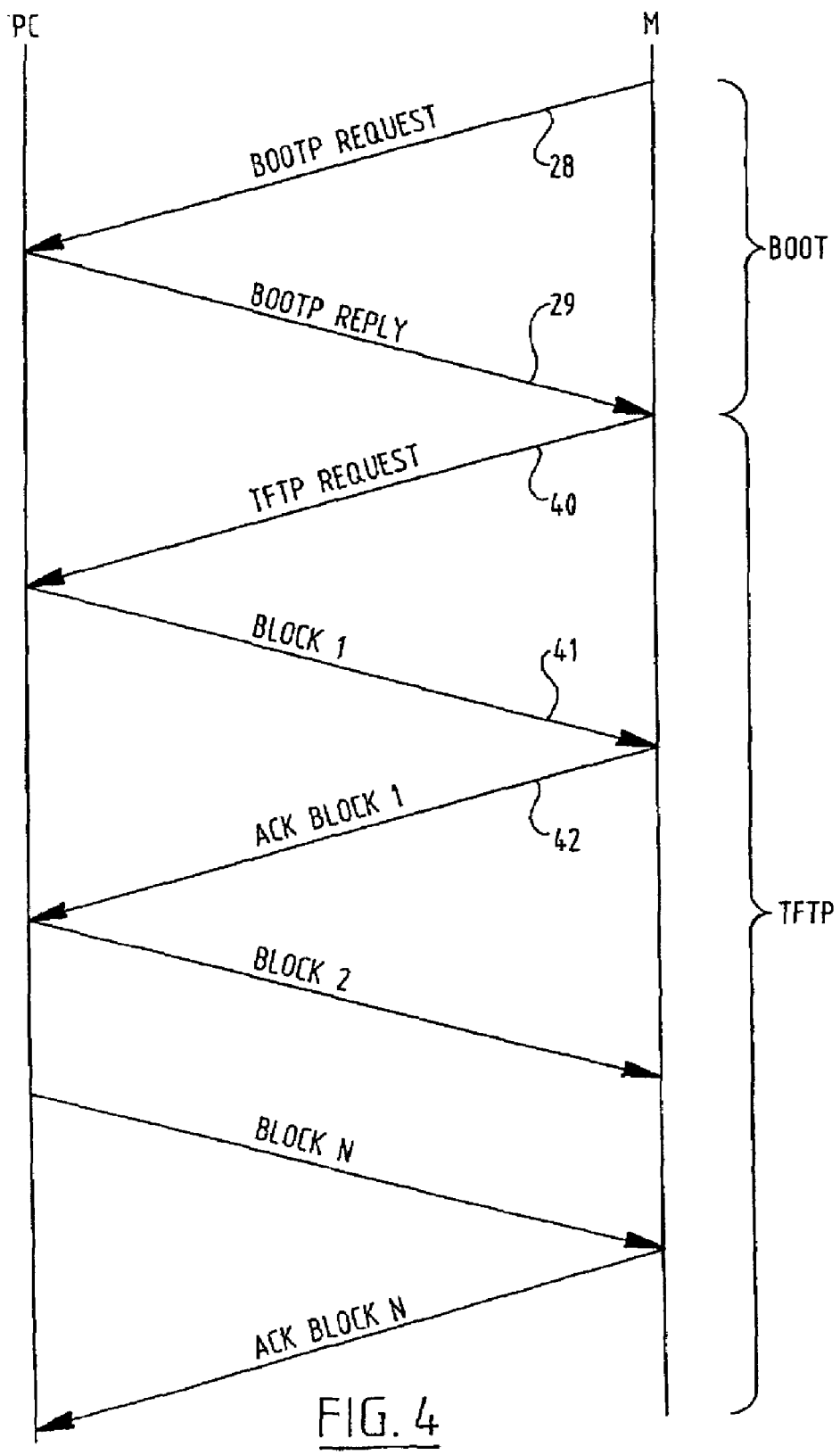
FIG. 4 illustrates the communication process between a modem device and a computer during the boot operation according to the method of the present invention.

FIG. 3 shows the protocol stack used by the boot code: Init, Trivial File Transfer Protocol (TFTP), Boot Protocol (BOOTP), User Data Protocol (UDP), Internet Control Message Protocol (ICMP), IP (Internet Protocol), Address Resolution Protocol (ARP), Ethernet, ETH USB (protocol for mapping Ethernet directly to USB). The task of the separate protocols will be explained below;

Referring now to FIG. 4, there is shown a diagram illustrating the communication between the modem device M and the computer PC, when a file is downloaded during the booting operation and no errors occur. First a BOOTP request is sent from the modem device to the PC, as indicated with arrow 28. This message contains information such as the MAC (Medium Access Control) address, vendor-specific information, etc., and is sent on both Ethernet and USB interfaces.

Referring to FIG. 3, it will now be explained how this BOOTP request is formatted. When the INIT module 30 is initialized, it first constructs a first field of the BOOTP request and passes it on to the BOOTP module 31, which will compose the complete BOOTP request, including information such as the MAC address. The UDP 33, IP 39 and, depending on the interface, the Ethernet 36 or the USB-Ethernet 35 modules will then add their headers to the BOOTP frame, as it goes down through the protocol stack. When it reaches the physical layer, it is broadcast over the USB and/or Ethernet network, depending on the active interfaces.

The MAC layer 34 controls the access to the Ethernet or USB interface, the address resolution protocol (ARP) 38 being used to convert the IP address into a physical address which is used to transmit the frames. The internet control message protocol (ICMP) allows account to be taken of functioning anomalies, such as congestion problems, by sending ICMP messages. When such a message is received the problem is dealt with by IP.

When the BOOTP request is sent, the modem device M will start waiting for a BOOTP reply. A valid BOOTP reply has to contain the required information, such as the IP addresses assigned to the modem, and of the TFTP server included in the PC according to the present embodiment, the file name with the full path to be downloaded, etc. When the BOOTP reply is received first from the USB interface, the further communication takes places over the USB interface, wherein the same applies for the Ethernet interface. In this embodiment the PC replying first gets priority. As explained in the introduction other implementations are possible, such as giving priority to the PC where the most up to date upgrade file is stored.

Arrows 29 and 40 illustrate that, once the modem device as received a valid BOOTP reply, the TFTP transfer is initiated by the modem device, which sends a TFTP request to the TFTP server at the IP address specified in the BOOTP reply. This request can also contain an option negotiation for a TFTP block size of 8192 bytes.

The modem now waits for the first data packet to arrive. When a data packet arrives, the file header is analysed to determine the start address which indicates whether the file has to be flashed, in which case it has to be buffered first in the SDRAM, or placed immediately at the correct address in the SDRAM.

After the data of the first packet has been placed successfully in the SDRAM, an acknowledgement packet (ACK) is sent to the computer, as shown by the arrow 42. These steps are repeated until the last packet is received.

Figure 5:
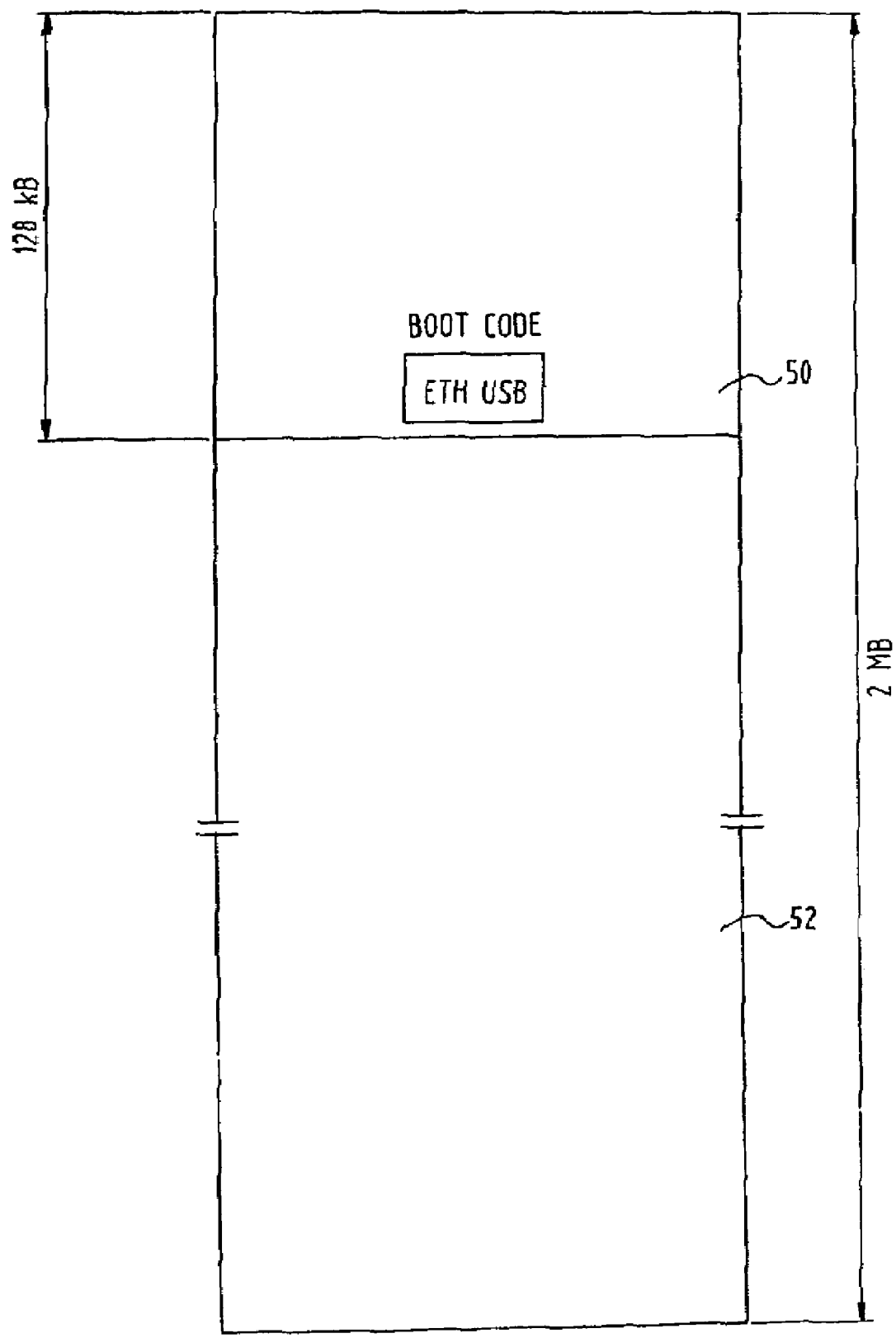
FIG. 5 is a diagram showing the different software components in a flash memory of a modem device according to the present invention.

FIG. 5 shows schematically the different software components that reside in the flash memory, which typically has a size of 2 Mb. The boot code 50 typically fills the top 128 kb of the flash memory, and includes the Ethernet protocol handling part of the USB code (ETH USB). This area further uses the Board Support Package (BSP) to access several hardware components, like LEDs and timers.

The flash memory further comprises in 52 operation software, a file system for normal operation purposes, and space used by the file system.

Figure 6:
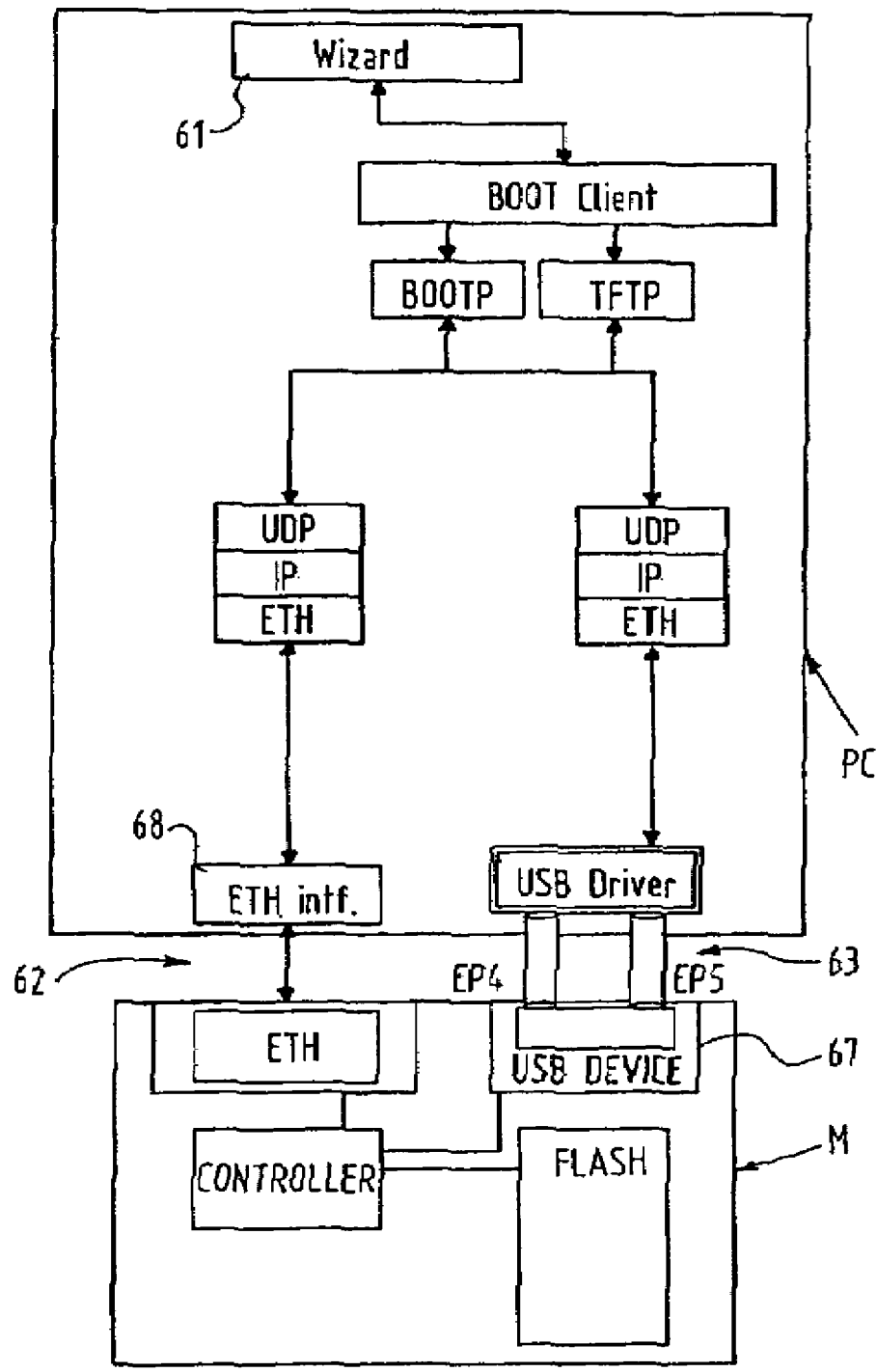
FIG. 6 is a block diagram illustrating a system comprising a modem and a computer implementing the upgrading of software over a USB using the method according to the present invention.

Referring now to FIG. 6, there is shown a block diagram illustrating the protocols used during a software upgrade of a modem device M, running a wizard 61 on a PC connected to said modem via the USB 63 or Ethernet 62 interface. When the USB interface 63 is active, and when the wizard 61 is started, a connection is established to the USB driver.

When the modem M is connected to the wizard over the USB interface, the wizard will listen for BOOTP requests sent by the modem M. The BOOTP request arriving from the USB interface of the modem via EP5 will be encapsulated in UDP/IP/ETH/USB frames. The USB driver 64 will decapsulate the frames to UDP/IP/ETH frames, whereupon these frames will be further decapsulated and transferred to the wizard 61.

The wizard 61 will then send a BOOTP reply to the USB driver 64, which will be encapsulated in UDP/IP/ETH. The USB driver then forwards the received packets to the USB device via EP4.

In the same way, the modem M then sends a TFTP request which will be received by the wizard 61, which in turn will reply by sending the requested file using TFTP.

When the modem M is connected to the wizard over the Ethernet interface, an analogue process takes place.

Figure 7:
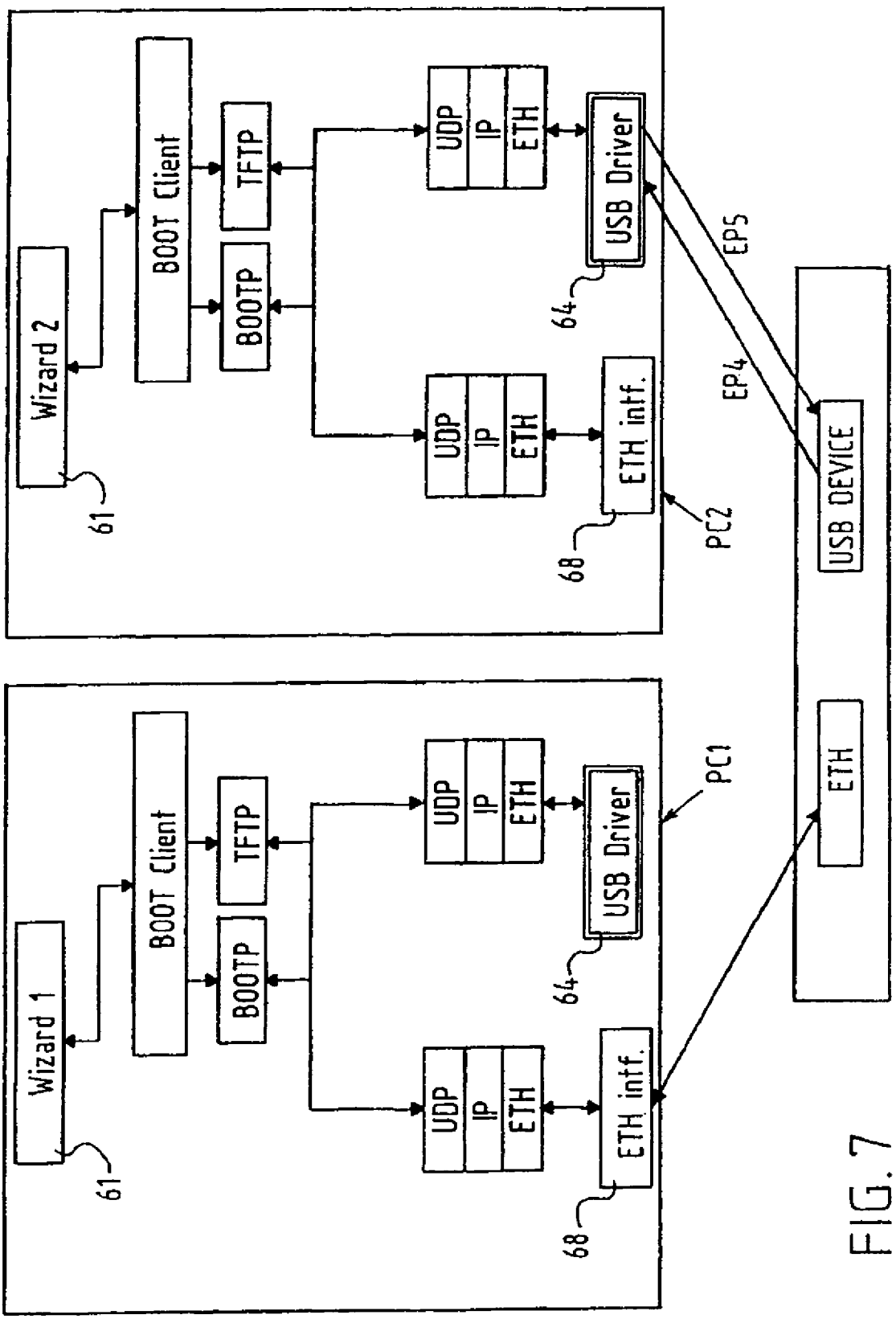
FIG. 7 is a block diagram illustrating a modem according to the present invention, which modem is connected to a first PC over the Ethernet interface, and to a second PC over the USB interface.

Referring to FIG. 7, a modem M is connected to a first PC1 over the Ethernet interface, and to a second PC2 over the USB interface 68. In this case the wizard 61 will only upload the software to the interface that is initiated for the TFTP transfer and not to both Ethernet and USB interfaces.

The illustrative embodiments described and shown herein relate specifically to a PC-based operating system. It will be understood, however, that the present invention is not limited to a PC-based operating system, and that the invention can also be used with Unix and Macintosh systems, or any other systems provided with a USB interface.

Although a specific embodiment has been illustrated and described herein, it will be appreciated that the invention also covers modifications and variations; the scope of the present invention is to be determined on basis of the annexed claims.

The invention claimed is:

1. Electronics device, such as a modem, having an interface operable with a complete protocol stack code in normal operation, and comprising a non-volatile memory, such as a flash memory containing a code for booting said device, wherein software of said device is upgradable during a booting operation of said device via said interface, wherein said boot code comprises a lightweight protocol stack code for said interface, said lightweight protocol stack comprising a subset of the layers of the complete protocol stack.

2. Device according to claim 1, wherein said boot code comprises a control code for detection of said interface, and a protocol handling code for transmitting and receiving via said interface.

3. Device according to claim 1, wherein said interface is a USB interface.

4. Device according to claim 3, wherein said boot code contains the Ethernet on USB mapping part of said complete protocol stack code.

5. Device according to claim 3 having a second memory, wherein said second memory comprises the complete USB protocol stack code for communication over a wide area network.

6. Device according to claim 1, further comprising an Ethernet interface and a code for transmitting and receiving via said Ethernet interface during the boot operation.

7. System for downloading files to an electronic device according to claim 1, comprising said device and a computer provided with a driver for said interface, wherein said computer is connected to said device over said interface, wherein said remote computer contains an executable program code for communicating with said device and for providing the files to be downloaded.

8. System according to claim 7, wherein said interface is a USB interface, wherein a connection is established respectively on endpoints 4 and 5 of the USB interface to allow frames to be sent to and from the USB device.

9. Method for downloading a file into a memory part of an electronic device provided with a USB connection, comprising the steps of:
- storing said file in a one or more computers, wherein at least one computer is provided with a USB interface;
- connecting said device to one or more computers over at least the universal serial bus;
- sending at least one boot request from said device to said one or more computers over said USB interface using a reduced USB protocol stack compared to a complete USB protocol stack;
- sending at least one boot reply from said one or more computer to said device;
- sending a file transfer request from said device to one of said one or more computers;
- sending said stored file from said one computer to said device.

10. Method according to claim 9 for downloading a file into a memory part of an electronic device provided with a USB and an Ethernet connection, wherein the electronic device is connected to at least one computer over an Ethernet connection.

* * * * *